United States Patent Office 3,342,262
Patented Sept. 19, 1967

3,342,262
METHOD OF INCREASING OIL RECOVERY
Jack A. King and Wayne S. Fallgatter, Tulsa, Okla., assignors to Cities Service Oil Company, Bartlesville, Okla., a corporation of Delaware
No Drawing. Filed Mar. 2, 1965, Ser. No. 436,633
8 Claims. (Cl. 166—29)

ABSTRACT OF THE DISCLOSURE

Method for selectively plugging permeable channels in oil producing formations by the cyclic introduction of treating solutions, each portion of the treating reactants being separated by an inert spacing medium. The relative amount of spacing medium is decreased during the treating operation, causing the reactants to contact each other in concentric regions of the formation increasingly approaching the injection well.

---

When oil wells are operating under natural driving pressures, the flow of oil into the well is often accompanied by an undesirable flow of water, or brine, which reduces the rate of oil production, burdens the recovery equipment, and contaminates the product obtained from the well.

When waterfloods, or gas drives are employed in the secondary recovery of oil after natural drives have become exhausted or reached the point of economic depletion, the pressurized flooding medium moves outwardly from the injection well so as to build up before it and move a band of oil toward the production well. Even if the oil-bearing strata were of substantially constant permeability throughout, it would not be theoretically possible to recover substantially all of the oil present in the strata. The so-called irreducible oil saturation in a strata of uniform permeability after waterflooding may be from about 20% to 30%. In addition, variations in the permeability of the strata results in a tendency of the driving fluid to channel through the more permeable areas of the formation. Oil deposits in the less permeable areas of the strata may, as a result, be by-passed. Such channeling is of particular concern in strata that has been previously subjected to high-pressure fracturing techniques.

The driving fluid follows the more permeable channels in the strata so as to eventually increase the production of driving fluid to the point where the recovery process becomes economically undesirable. For a waterflood, the maximum water to oil ratio is normally about 100 barrels of produced water per barrel of oil. Preferably, it is desirable to operate at a much lower water to oil ratio, with five to ten barrels of water per barrel of oil being generally considered as an acceptable operating condition.

In order to obtain such a water to oil ratio, control or adjustment of permeability has been attempted to provide the uniformity of strata necessary to overcome the undesirable channeling of the flood water.

It has been proposed that the permeable strata be treated with reactants that, upon contact within the permeable strata, will form a precipitate that will obstruct the more permeable pores and provide a limited control of porosity. According to this method, an operator at ground level may selectively plug the strata to any desired degree at a predetermined distance from the injection well. This method of plugging the strata may be employed in the treatment of any fluid-permeable strata into which chemical solutions can be introduced. Two oil-insoluble solutions containing chemically active components that will react at a given time to produce a precipitate effective for reducing the water permeability of the strata are introduced into an injection well of a waterflooding operation. Such methods are described in U.S. Patents 2,747,670 and 2,807,324.

While such methods have resulted in some plugging of the more permeable strata, they have not been completely successful in producing satisfactory water to oil ratios. While the precipitates formed in the strata serve to plug the more permeable areas in which they are formed, sufficient coverage of the strata to achieve an adequate overall reduction in the channeling of the flood water has not been realized. In addition, the surface injection pressure frequently has not approched the limiting value imposed by the existing water plant injection facilities available in the field when the desired quantity of reactants has been injected into the formation. Since the surface pressure during injection is generally regarded as a measure of the effectiveness of the plugging operation, it is highly desirable to have the surface pressure approach as near as possible the limiting value existing facilities will tolerate, but remaining below the pressure necessary to fracture the formation. If the surface injection pressure has not approached its limiting value when all of the desired reactants have been added to the formation, the reduction in the water to oil ratio may not be as satisfactory as the reduction that would have occurred had the surface pressure reached its limiting value.

It has heretofore been necessary to add additional quantities of reactants to the formation in order to achieve the increased plugging that will result in higher surface injection pressures. The use of such larger quantities of reactants, however, tends to plug the more permeable and less permeable areas alike, thereby reducing the amount of oil recovered from some of the less permeable regions of the treated strata.

It is an object of this invention, therefore, to provide an improved method for controlling the permeability of oil and gas-bearing formations.

It is another object of this invention to provide an improved selective plugging method for adjusting strata permeability.

It is a further object of this invention to provide a selective plugging procedure in which the placement of the precipitate is controlled so as to provide a relatively uniform permeability profile throughout the entire area treated during the selective plugging operation.

It is a further object of this invention to provide an improved selective plugging method in which a heavier deposit of precipitate is deposited in a given area.

It is a further object of this invention to provide a selective plugging method in which the area of the formation in which the precipitate is placed is substantially increased.

It is a further object of this invention to provide an improved selective plugging procedure in which the limiting surface injection pressure is approached.

It is a further object of this invention to provide an improved selective plugging procedure in which the limiting surface pressure is approached without the injection of an excessive quantity of reactants.

With these and other objects in view, the present invention is herein described, the novel features thereof being pointed out in the appended claims.

By means of the present invention, it is possible to employ a predetermined amount of reactants and to approach the limiting surface injection pressure that field conditions will tolerate. To achieve this result, the reactants used to form the precipitate in the formation and the spacing medium are injected into the formation in small alternate slugs or cycles, each cycle consisting of a relatively small quantity of each of the chemical solutions separated by a small quantity of the spacing medium. Operating in this manner results in the deposition of a heavy concentration of precipitate in a given area due to many reacting bands passing through the treated area.

In one embodiment of the present invention, the quantity of the spacing medium separating the reactants is reduced during the course of the plugging operation. As a result, the solutions of the various reactants will contact one another in concentric regions of the formation increasingly approaching the injection well. Thus, the more permeable strata in a greater area of the formation will be selectively plugged. This will be reflected in an increase in the injection pressure noted at the surface. As a result, the desired quantity of reactants can be effectively placed in the more permeable channels of a greater area of the formation so as to improve the plugging operation without such excessive plugging as would result in the loss of oil recovery from the less permeable strata in the region plugged.

The exact amount of reduction in the quantity of the spacing medium during the progress of the selective plugging operation is not a critical feature of this invention. In the field, however, the following procedure has been found convenient and desirable. One barrel of each of the reactant solutions has been employed for each cycle of the selective plugging operation. During the first 15% to 45% of the treating cycles three barrels of the spacing medium have been employed. During the next 15% to 45% of the treating cycles, two barrels of the spacing medium have been employed. During the final 10% to 70% of the treating cycles, one barrel of spacing medium has been employed. If an exceptionally large selective plugging treatment is being performed, it may be desirable to use a larger quantity of spacer medium during the initial cycles of the operation, e.g. four to six barrels. As indicated above, the use of increasingly smaller spacer slugs results in the reaction precipitate being placed in the permeable strata of a greater area of the formation with a consequent increase in the surface injection pressure.

It has been found that a large number of water soluble salts of various metals can be used as one of the reactant solutions necessary to produce the desired precipitate. For example, water soluble salts of iron, aluminum, calcium, cobalt, nickel, copper, mercury, silver lead, chromium, zinc, cadmium and magnesium may be used. The water soluble salts of these metals produce a precipitate of a base metal compound when brought into contact with an alkaline solution.

The concentration of these salts in solution will vary depending upon the particular strata being treated and the degree of permeability adjustment necessary or desired. An aqueous solution of from 5% to 25% by weight of the active component will generally be sufficient.

Likewise, a number of alkali solutions can be used in accordance with the present invention. Examples of suitable alkali solutions include sodium hydroxide, sodium carbonate, sodium silicate, sodium borate, and sodium phosphate. Other soluble salts of these anions, such as the salts of potassium, ammonium and the like, may also be used. These solutions, likewise, may be of varying strength, with 5% to 25% by weight of the active component being generally preferred.

It is usually desirable to produce a gelatinous type of precipitate, which will form an insoluble deposit that will adhere to the walls of the pores of the strata. Such a precipitate is desirable because of the relatively high pressures employed during the waterflood. The reactant solutions should also be inert to the surrounding strata and to the naturally existing brines found in the formation.

Particularly effective results have been obtained in accordance with the present invention by employing sodium silicate and aluminum sulfate as the reactants. The sodium silicate has been used advantageously in a 20% by weight aqueous solution. Aluminum sulfate has been advantageously employed in a 12.5% by weight aqueous solution. At these concentrations, equal volumes of the two solutions neutralize each other causing aluminum hydroxide, silica gel, and possibly some aluminum silicate, to precipitate.

The total amount of chemicals used in a selective plugging operation will depend upon the characteristics of the strata to be treated and the desired permeability adjustment. In the absence of previous experience in a particular area, the required amount of chemicals is generally based upon the footage of pay, i.e. the formation thickness, modified to account for the permeability characteristics of the strata being treated. For example, it has generally been found satisfactory to employ about 27.5 gallons of sodium silicate, measured as 37% solution, and 100 pounds of hydrated aluminum sulfate per foot of pay.

The chemical solutions employed in this invention should not be injected into the formation without a quantity of spacing medium between them. If one chemical is injected directly behind the other without a spacing medium, reaction will occur immediately at the zone of contact, resulting in plugging material being formed in the injection system. Fresh water is generally preferred as the spacing medium for use in the present invention. Water soluble, oil insoluble liquids, such as methanol may also be employed. It has generally been found that the readily available brines react with one or both of the reactants employed. For this reason, the readily available brines should not generally be employed as the spacing medium.

The surface injection pressure employed during the selective plugging operation will generally be limited by the water plant injection facilities available at the particular site. As previously indicated, it is generally desirable to permit the injection pressure to approach this limiting value, since the detection of an increase in surface injection pressure is generally regarded as an indication of successful plugging. The method of the present invention permits the desired quantity of chemicals to be added to the formation so that the surface injection pressure will approach its limiting value. In certain instances, it may be necessary to alter the anticipated injection schedule during the plugging operation. For example, if the surface injection pressure is rising rapidly, the use of smaller quantities of spacer medium may be postponed until the rate of pressure increase levels off at some more normal rate. If the quantity of spacer medium were reduced while the pressure was rising at an excessive rate, an even greater increase in pressure build-up would result, causing the limiting pressure to be reached before all of the desired chemicals could be added to the formation.

The following example is given to further illustrate the practice of the present invention and is not intended to limit the scope of the invention as set forth in the appended claims. A selective plugging operation in accordance with the present invention was performed on the Benson Lansing-Kansas City Waterflood Unit in Pawnee County, Kansas. A single injection well was employed in an injection well-offset production well system in which water breakthrough had occurred in one of the offset producing wells. Before plugging, a production test showed it to be making 9 barrels of oil and 150 barrels of water per day. The injection well had been averaging 300–400 barrels per day of water under vacuum for over a year prior to the selective plugging operation.

Fifty-one barrels of 20% sodium silicate were prepared by adding 27.5 barrels of 37% sodium silicate to 23.5 barrels of water. Similarly, 4000 pounds of hydrated aluminum sulfate were added to 47 barrels of water to make 51 barrels of 12.5% aluminum sulfate solution. The solutions were injected into the formation in small alternate slugs separated by fresh water spacer by means of a positive displacement pump.

During the first ten cycles of chemical injection, each cycle comprised one barrel each of sodium silicate solution and aluminum sulfate solution separated by three barrels of fresh water spacer. During the next ten cycles, one barrel each of the sodium silicate and aluminum sulfate solutions were employed, together with two barrels of water spacer. Tubing pressure rose gradually throughout the injection period from zero to about 210 pounds. The injection rate was about 0.3 barrel per minute during this period.

During the final five cycles, one barrel each of the sodium silicate and aluminum sulfate solutions were employed, together with one barrel of water spacer. Nineteen barrels of fresh water were then injected in order to flush all chemicals into the formation.

After the plugging operation, the well took approximately 600–700 barrels of water per day at 90–100 p.s.i. wellhead pressure. The increased oil production and improved water to oil ratio are indicated in the following table.

TABLE

| Month | Unit Production Daily Average (bbls.) | |
|---|---|---|
| | Oil | Water |
| 1 | 42 | 323 |
| 2 | 31 | 373 |
| 3 | 34 | 300 |
| 4 | 54 | 294 |
| 5 | 69 | 406 |
| 6 | 89 | 301 |

The selective plugging operation was carried out in the middle of the third month and the response was immediate. One of the offset producing wells showed increased oil recovery within a few days of the selective plugging operation and improved production was noted in all of the offset producing wells within a month of the plugging operation.

While the invention has been described above with respect to certain embodiments thereof, it will be understood by those skilled in the art that various changes in modifications may be made without departing from the spirit and scope of the invention. It is intended that all such changes and modifications be covered by the appended claims.

We claim:

1. In the method of selectively adjusting the permeability of oil producing formations by the introduction of precipitate-forming reactants into the formation in the vicinity of undesirable fluid flow, the improvement wherein the desired quantity of reactants may be employed at pressures approaching the limiting injection pressure under existing field conditions comprising introducing the treating solutions into the formation in cycles, each cycle consisting of a portion of said treating reactants separated by an inert spacing medium, the relative amount of spacing medium employed being decreased during the treatment operation so that the reactants will contact each other in concentric regions of the formation increasingly approaching the injection well, whereby the precipitates are deposited in a heavy concentration of the more permeable channels of a relatively large area of the strata surrounding the injection well causing the surface injection pressure to approach its limiting value rendering the injection of the desired quantity of reactants into the formation.

2. The method of claim 1 in which the reactants are solutions of sodium silicate and aluminum sulfate.

3. The method of claim 1 in which the quantity of spacing medium employed is within the range of from about one barrel and about six barrels per treating cycle.

4. The method of claim 3 in which the inert spacing medium is fresh water.

5. The method of claim 1 in which about three parts of spacing medium are employed during the first 15% to 45% of the treating cycles; about two parts of spacing medium are employed during the next 15% to 45% of the treating cycles; and about one part of spacing medium is employed during the final 10% to 70% of said treating cycles.

6. The method of claim 5 in which one barrel of a solution of each reactant is employed and three barrels of spacing medium are employed during the first 15% to 45% of the treating cycles; two barrels of spacing medium are employed during the next 15% to 45% of the treating cycles; and one barrel of spacing medium is employed during the final 10% to 70% of said treating cycles.

7. The method of claim 6 in which the spacing medium is fresh water.

8. The method of claim 6 in which the reactants are solutions of sodium silicate and aluminum sulfate.

References Cited

UNITED STATES PATENTS

| | | | |
|---|---|---|---|
| 1,421,706 | 7/1922 | Mills | 166—38 X |
| 2,001,350 | 5/1935 | Mills | 166—38 |
| 2,272,672 | 2/1942 | Kennedy | 166—38 X |
| 2,747,670 | 5/1956 | King et al. | 166—38 X |
| 2,807,324 | 9/1957 | King et al. | 166—38 X |
| 3,004,598 | 10/1961 | Ramos et al. | 166—38 X |
| 3,250,330 | 5/1966 | Smith | 166—38 X |

ERNEST R. PURSER, *Primary Examiner.*

CHARLES E. O'CONNELL, DAVID H. BROWN, *Examiners.*